United States Patent
Apostolopulos et al.

(10) Patent No.: US 6,757,735 B2
(45) Date of Patent: Jun. 29, 2004

(54) METHOD FOR DISTRIBUTING MULTIPLE DESCRIPTION STREAMS ON SERVERS IN FIXED AND MOBILE STREAMING MEDIA SYSTEMS

(75) Inventors: John G. Apostolopulos, San Carlos, CA (US); Sujoy Basu, Mountain View, CA (US); Gene Cheung, Tokyo (JP); Raj Kumar, Los Altos, CA (US); Sumit Roy, Menlo Park, CA (US); Bo Shen, Fremont, CA (US); Wai-Tian Tan, Mountain View, CA (US); Susie J. Wee, San Carlos, CA (US); Tina Wong, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 369 days.

(21) Appl. No.: 09/898,643

(22) Filed: Jul. 3, 2001

(65) Prior Publication Data
US 2003/0009535 A1 Jan. 9, 2003

(51) Int. Cl.⁷ .......................... G06F 15/16; H04N 7/173
(52) U.S. Cl. .......................... 709/231; 709/235; 725/96
(58) Field of Search .................. 709/231, 235; 725/62, 63, 94, 95, 96, 114, 115, 116, 117, 118

(56) References Cited

U.S. PATENT DOCUMENTS

| | | | |
|---|---|---|---|
| 5,774,660 A | * | 6/1998 | Brendel et al. ............. 709/201 |
| 6,049,892 A | * | 4/2000 | Casagrande et al. .......... 714/18 |
| 6,195,680 B1 | * | 2/2001 | Goldszmidt et al. ........ 709/203 |
| 6,339,785 B1 | * | 1/2002 | Feigenbaum ................ 709/213 |
| 6,412,004 B1 | * | 6/2002 | Chen et al. ................. 709/226 |
| 6,463,454 B1 | * | 10/2002 | Lumelsky et al. .......... 718/105 |
| 6,598,071 B1 | * | 7/2003 | Hayashi et al. ............. 709/203 |
| 6,611,530 B1 | | 8/2003 | Apostolopoulos |
| 6,665,706 B2 | * | 12/2003 | Kenner et al. ............... 709/203 |
| 6,665,726 B1 | * | 12/2003 | Leighton et al. ............. 709/231 |
| 6,667,980 B1 | * | 12/2003 | Modi et al. ............ 370/395.32 |
| 2002/0147840 A1 | * | 10/2002 | Mutton et al. .............. 709/239 |

FOREIGN PATENT DOCUMENTS

| | | |
|---|---|---|
| EP | 0915598 | 5/1999 |
| WO | WO01/15427 | 3/2001 |

OTHER PUBLICATIONS

Sung–Ju Lee et al—"An Interactive Video Delivery and Caching System Using Video Summarization" —Compuer Communications 25 (2002) 424–435 —6 pages.

Nitin Gogate et al—"Supporting Applications in a Mobile Multihop Radio Enivironment Using Route Diversity—Part 1: Non–Real Time Data" —1998 IEEE (1998) pp. 802–806.

* cited by examiner

Primary Examiner—Krisna Lim

(57) ABSTRACT

A method and system for streaming media data to a fixed client and/or a mobile client. In one method embodiment, the present invention recites encoding media data to be streamed to a client into a first multiple description bitstream and into a second multiple description bitstream. The present method then determines the appropriate plurality of servers from a network of servers onto which the first and second multiple description bitstreams should be distributed. The present embodiment then recites distributing the first and second multiple description bitstreams to the appropriate plurality of servers positioned at intermediate nodes throughout a network such that a client is provided with access to the media data via a plurality of transmission paths. The present method is also well suited to redistribution of multiple description bitstreams to servers based upon time-varying demand, client movement, and the like.

21 Claims, 7 Drawing Sheets

METHOD FOR DISTRIBUTING MULTIPLE DESCRIPTION STREAMS ON SERVERS IN FIXED AND MOBILE STREAMING MEDIA SYSTEMS

TECHNICAL FIELD

The present claimed invention relates to the field of streaming media. More specifically, the present claimed invention relates to delivering streaming data to fixed clients and/or mobile clients using multiple description bitstreams and various forms of diversity.

BACKGROUND ART

Today's networks, such as the Internet, are primarily designed for delivering static, non-real-time data to fixed clients such as desktop computers and laptops. Developing a system that delivers real-time streaming media to mobile clients presents an even greater series of challenges due to the streaming nature of the data and the mobility of the user. These challenges are intensified when considering issues such as system scalability, which extends service to a larger number of users; and quality-of-service and fault tolerance, which provides mobile users with continuous, uninterrupted streaming media sessions. Furthermore, this robust, uninterrupted media delivery session must be delivered over best-effort networks, which provide best effort, but non-guaranteed levels of service. A solution that overcomes these many challenges requires innovation throughout the end-to-end system.

Currently, multimedia applications such as video and audio communication over the Internet or wireless links are hampered by the limited bandwidth and losses (e.g. packet loss or bit errors) that afflict these error-prone environments. These multimedia applications require high compression and high error resilience, however simultaneously achieving these qualities is difficult because these are largely conflicting requirements.

Two important characteristics of a media communication system are reliability and efficiency. For the problem of streaming media from a wired infrastructure to a wireless mobile client, a sequence of operations is performed where each is a possible point of failure. The conventional approach to achieve reliability in such a system is by duplicating resources, e.g. "mirrored servers" or transmitting the same information twice. This approach can reduce the probability of certain failures by providing backups, however it is inefficient as it requires twice as many resources and is still susceptible to other single points of failure.

The following is a more specific example of a conventional approach to streaming media from a wired infrastructure to a wireless mobile client, and the problems associated therewith. Streaming media from a wired infrastructure to a mobile client involves operation of a sequence of modules. If all of these modules work properly, then the communication is successful. However, if any of these modules is faulty, then the entire communication is unsuccessful. For example, a typical communication may involve a server reading a media stream from storage, sending it over a wired network to a wireless base station, the wireless base station then transmits the stream over the wireless channel to the wireless client. This system involves the interaction of at least the following modules (1) storage, (2) server, (3) wired network, (4) wireless base station, (5) wireless transmission in wireless cells. If all of the modules work properly then the communication is successful, however if any module is faulty the communication is unsuccessful. In an effort to improve reliability system designers typically add redundancy to remove single point of failure. For example, two sets of any hardware may be used instead of one, e.g. two storage modules or two servers, which are "mirrored" to contain the same information. Similarly, the same information may be transmitted twice in the wired network. In addition, the wireless transmission, assuming CDMA and soft-handoff, typically involves two or more transmissions of the same information. In each of these conventional approaches, the improved reliability is achieved by duplicating the information and/or the resources.

While these conventional methods of duplication improve reliability, they are also inefficient because they use twice as many resources. In addition, this conventional approach may be ineffective if a single fault may afflict both duplicates. For example, if both storage modules (and/or both servers) are at the same location, a power outage or flood would render both of them useless. When the same information is transmitted twice in a wired network, the information typically proceeds along the same path in the network. Therefore, if that same path is congested or experiences an outage. then both duplicates of the information would be lost. To summarize, in an attempt to improve reliability the conventional approach is to duplicate information and resources. This conventional approach is inefficient because of the duplication, and is also ineffective because in many cases there can still exist single points of failure.

Although portions of the above-listed discussion specifically mention the shortcomings of prior art approaches with respect to the streaming of video data for simplified presentation, such shortcomings are not limited solely to the streaming of video data. Instead, the problems of the prior art span various types of media including, but not limited to, audio-based data, speech-based data, image-based data, graphic data, web page-based data, and the like. Moreover, streaming media typically shares the property that the media streams must be delivered with a relative time constraint and thus share the notion of a stream.

Thus, the need has arisen for a method and system for streaming media to fixed clients and/or mobile clients. A further need exists for a method and system for streaming media to fixed clients and/or mobile clients wherein the method and system provides increased reliability and efficiency over conventional systems.

DISCLOSURE OF THE INVENTION

The present invention provides a method and system for streaming media to fixed clients and/or mobile clients. The present invention further provides a method and system for streaming media to fixed clients and/or mobile clients wherein the method and system provides increased reliability and efficiency over conventional systems.

Specifically, in one method embodiment, the present invention recites encoding media data to be streamed to a client into a first multiple description bitstream and into a second multiple description bitstream. The present method then determines the appropriate plurality of servers from a network of servers onto which the first and second multiple description bitstreams should be distributed. The present embodiment then recites distributing the first and second multiple description bitstreams to the appropriate plurality of servers disposed at intermediate nodes throughout a network such that a client is provided with access to the media data via a plurality of transmission paths. The present method is also well suited to redistribution of multiple description bitstreams to servers based upon time-varying demand, client movement, and the like.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding", "transmitting", "storing", "distributing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
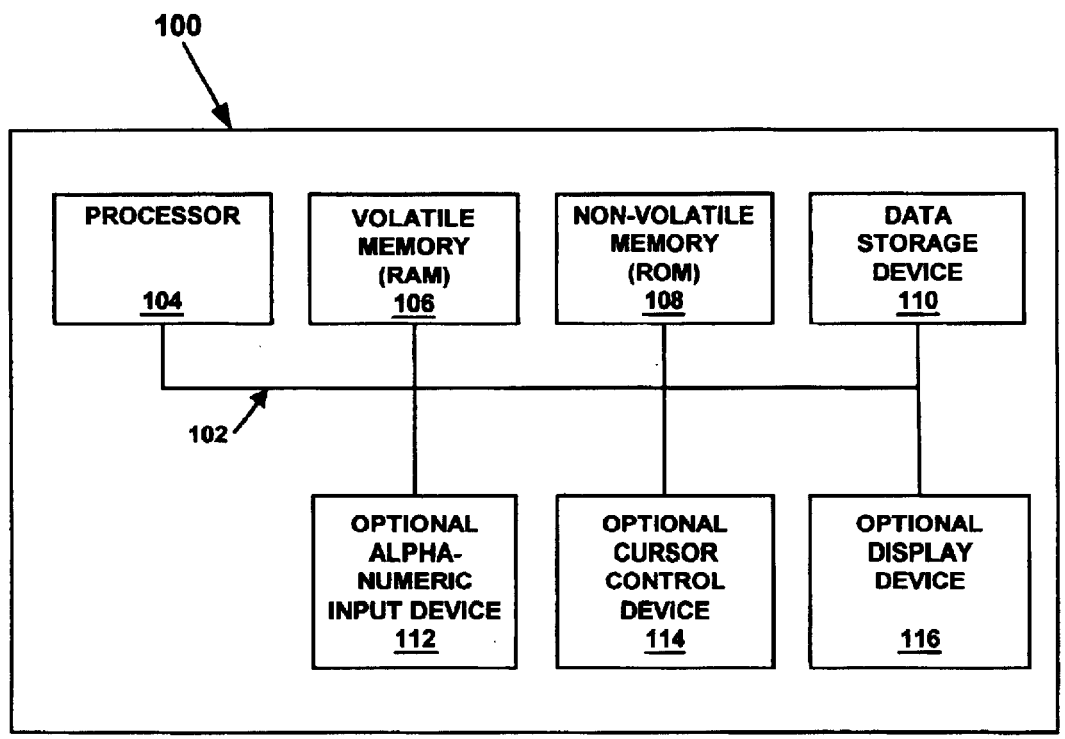
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable nonvolatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

General Method and System for Reliably and Efficiently Streaming Media to Fixed and/or Mobile Clients As an overview, the present invention provides a method and system for streaming media to fixed and/or mobile clients wherein the method and system achieve improved efficiency by using complementary information (as opposed to duplicate information employed in conventional approaches). The present invention further provides a method and system for streaming media to fixed and/or mobile clients wherein the method and system improve reliability by using various forms of diversity to prevent single points of failure.

For purposes of clarity and brevity, the following discussion and examples will specifically deal with video data. The present invention, however, is not limited solely to use with video data. Instead, the present invention is well suited to use with audio-based data, speech-based data, image-based data, web page-based data, graphic data and the like. Of course, buffering and downloading are allowed, and various degrees of buffering can be accommodated in this system; thus, this system supports both live and buffered media streams. Furthermore, note that all these media types can be coded with the properties of multiple description bitstreams described herein.

One approach for reliably delivering streaming media is disclosed in commonly-owned, co-pending U.S. patent application Ser. No. 09/400,416, entitled "Video Communication Using Multiple Streams", filed Sep. 21, 1999 to J. G. Apostolopoulos. Another approach for reliably delivering streaming media is disclosed in commonly-owned, co-pending U.S. patent application Ser. No. 09/784,226, entitled "Method and System for Packet Communication Employing Path Diversity" filed Jan. 19, 2001 to J. G. Apostolopoulos et al. Yet another approach for reliably delivering streaming media is disclosed in commonly-owned, co-pending U.S. patent application Ser. No. 09/784, 223, entitled "Video Communication System Employing Multiple State Encoding and Path Diversity", filed Jan. 19, 2001 to J. G. Apostolopoulos. U.S. patent application Ser. No. 09/400,416, U.S. patent application Ser. No. 09/784, 226, and U.S. patent application Ser. No. 09/784,223 are each incorporated herein by reference as background material. These patent applications relate to a system for reliable video communication over lossy packet networks while preserving high compression efficiency. Portions of the prior work were composed of two systems: (1) a multiple description video coding system, and (2) a path diversity transmission system.

Figure 2:
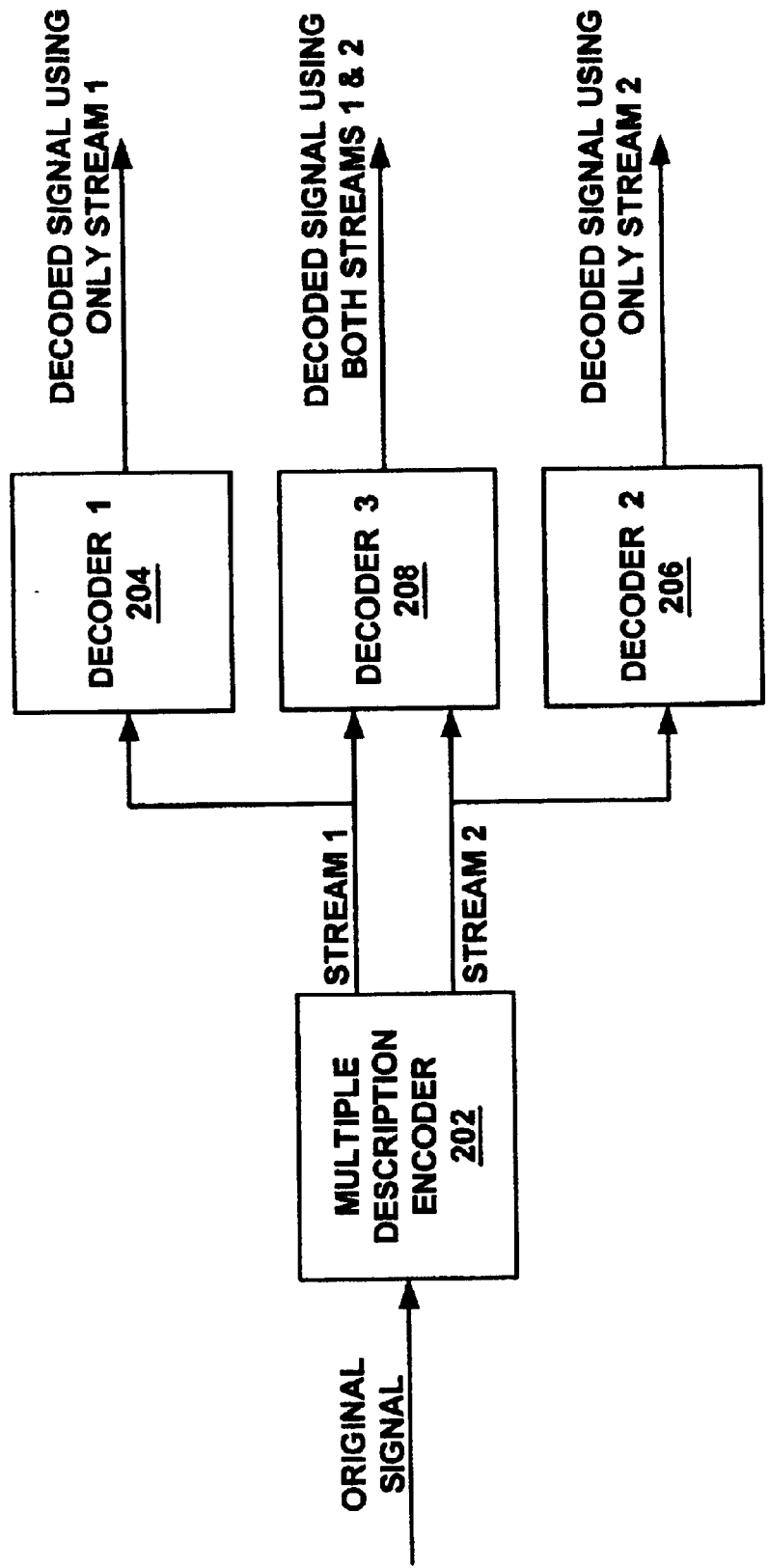
FIG. 2 is a schematic diagram illustrating multiple description coding of media data as employed in accordance with various embodiments of the present claimed invention.

With reference now to FIG. 2, a schematic diagram illustrating multiple description coding of media data as employed in conjunction with various embodiments of the present invention is shown. Multiple Description Coding (MDC) refers to one form of compression where the goal is to code an incoming signal into a number of separate bitstreams, where the multiple bitstreams are often referred to as multiple descriptions. These separate bitstreams have the property that they are all independently decodable from one another. Specifically if a decoder receives any single bitstream it can decode that bitstream to produce a useful signal (without requiring access to any of the other bitstreams). MDC has the additional property that the quality of the decoded signal improves as more bitstreams are accurately received. For example, assume that a video is coded with MDC into a total of N streams. As long as a decoder receives any one of these N streams it can decode a useful version of the video. If the decoder receives two streams it can decode an improved version of the video as compared to the case of only receiving one of the streams. This improvement in quality continues until the receiver receives all N of the streams, in which case it can reconstruct the maximum quality. As shown in FIG. 2, a multiple description encoder 202 codes an original signal into two streams, referred to as stream 1 and stream 2. In the example of FIG. 2, there are three decoders 204, 206, and 208. Each of decoders 204, 206, and 208 receive different bitstreams. Decoder 1 204 receives only stream 1 and decodes that stream to produce usable video. Decoder 2 206 receives only stream 2 and decodes that stream to produce usable video. Decoder 3 208 receives both stream 1 and stream 2 and decodes both streams to produce higher quality video than either decoder 1 204 or decoder 2 206.

There is a critical difference between the present multiple description based approach for streaming media delivery and prior approaches, such as scalable or layered coding approaches for streaming media delivery. Namely, in scalable or layered coding the video is also coded into multiple bitstreams, however one bitstream, referred to as the baselayer bitstream, is critically important and must be correctly received in order to produce a usable decoded media stream. Specifically, in the conventional scalable or layered approaches for streaming media delivery, even if all the bitstreams except the baselayer bitstream are correctly received, they are essentially useless unless the baselayer bitstream is correctly received, creating a single point of failure. The present multiple description based streaming media delivery does not have this problem since as long as any multiple description bitstream is received it can be decoded to produce usable quality video, and as more multiple description bitstreams are received the quality of the decoded video increases.

There are a number of different approaches to achieve MDC coding of video. One approach is to independently code different frames into different streams. For example, each frame of a video sequence may be coded as a single frame (independently of the other frames) using only intra frame coding, e.g. JPEG, JPEG-2000, or any of the video coding standards (e.g. MPEG-1/2/4, H.261/3) using only I-frame encoding. Then different frames can be sent in the different streams. For example, all the even frames may be sent in stream 1 and all the odd frames may be sent in stream 2. Because each of the frames is independently decodable from the other frames, each of the bitstreams is also independently decodable from the other bitstream. This simple form of MDC video coding has the properties described above, but it is not very efficient in terms of compression because of the lack of inter-frame coding.

A preferred embodiment of MDC video coding that provides the above properties and achieves high compression is given in the prior patent. This MDC video coding system does not require a back-channel and therefore can be applied in a wide variety of applications (e.g. broadcast or multicast). In addition, it has the attractive property that it can be applied as a standard-compatible enhancement within MPEG-4 Version 2 (with NEWPRED) and H.263 Version 2 (with RPS). Therefore any MPEG-4 Version 2 decoder can decode the resulting bitstream while an enhanced decoder designed to perform state recovery as presented in the prior patent can provide improved error recovery. This preferred embodiment of MDC video coding is assumed through the following discussion. However, a different video compression algorithm that has the same MDC properties as discussed above may also be used in its place.

Following is a discussion of path diversity as employed in conjunction with various embodiments of the present invention. Consider the case of multimedia communication over a packet network such as the Internet. Communication over the Internet is often hampered by congestion and packet loss. An important observation is that while one node or path in the network may be congested, other nodes or paths may have ample bandwidth. It would be advantageous to know the instantaneous quality of each path and to use that information to send packets along the "best" path (much like listening to a traffic report before leaving for work). However this is very difficult for a number of reasons, including the fact that the congested areas can vary quite rapidly.

While it may not be possible to know which paths are the best to use at any point in time, through appropriate system design one can still achieve significant performance improvements. Various embodiments of the present invention employ a path diversity system which explicitly sends different subsets of packets for an application over different paths, as opposed to the default scenario where the stream of packets proceeds along a single path. By using multiple paths at the same time some amount of averaging occurs and the end-to-end application effectively sees an "average" path behavior. Generally, seeing this average path behavior provides better performance than seeing the behavior of any randomly chosen individual path. For example, the probability that all of the multiple streams that are transmitted on different paths are simultaneously congested and have losses is much less than the probability that a single path is congested. The benefits of path diversity include (1) the application sees a virtual average path which exhibits a smaller variability in communication quality than exists over an individual path, (2) burst packet losses are converted to isolated packet losses, and (3) the probability of an outage (where all packets in the packet stream are lost for the duration of the outage) is greatly reduced. These advantages provide some important benefits to multimedia communication performance under packet loss. As will be discussed in detail below, the various embodiments of the present invention routes MDC traffic through semi-intelligent nodes at strategic locations in the Internet, thereby providing a service of improved reliability while leveraging the infrastructure of the Internet.

Path diversity may also exist in wireless networks. Various embodiments of the present invention employ a soft-handoff system in which a mobile client can simultaneously communicate with multiple base stations. In such cases, the benefits of path diversity mentioned above are also realized in a wireless environment.

Additionally, the MD video coding and path diversity employed in conjunction with the various embodiments of the present invention are useful even if used separately. For example, MD video coding can provide improved reliability even when sent over a single path. Similarly, path diversity provides a virtual channel with improved characteristics, enabling a simpler system design. However, when used together, MD video coding and path diversity complement, and also to a certain extent enhance, each other's capabilities. MD video coding provides multiple independently decodable bitstreams, which the transmission system explicitly sends over different paths, and the transmission system provides the video decoder with a high probability that at least one of the streams will be received correctly at any point in time. In one preferred embodiment of MD video coding, this enables the video decoder to perform state recovery to recover a corrupted stream.

Figure 3A:
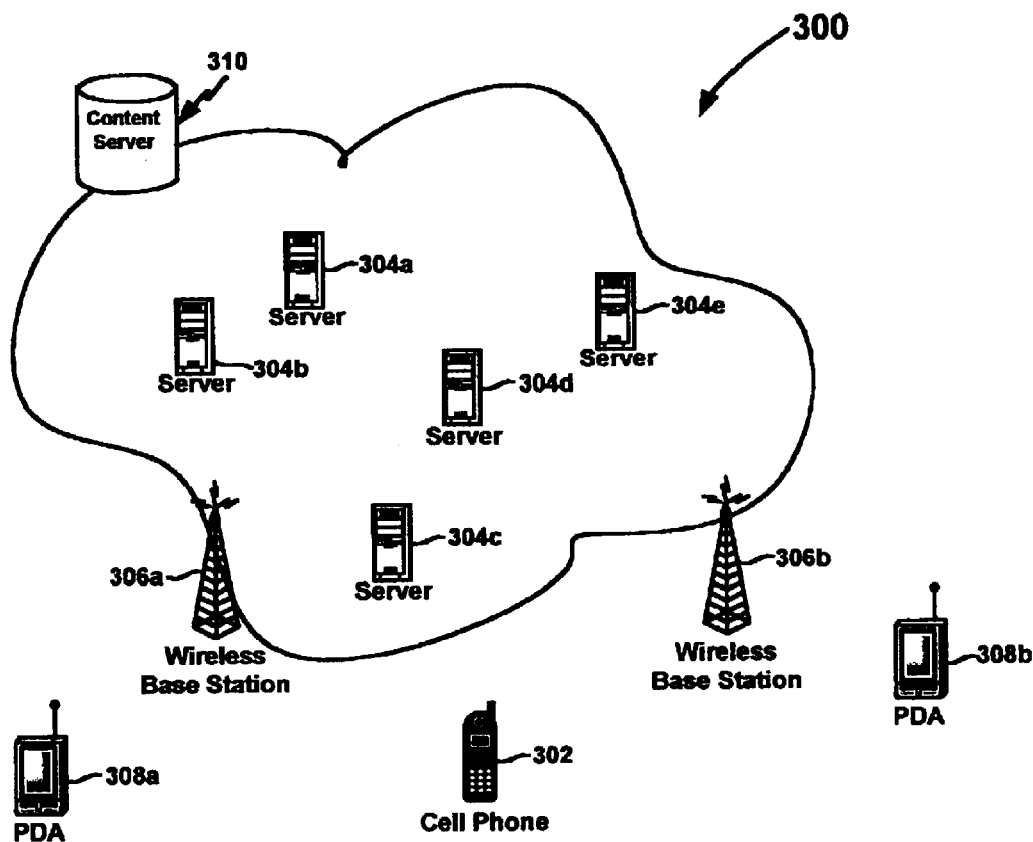
FIG. 3A is a schematic diagram illustrating a mobile client system employed in accordance with various embodiments of the present claimed invention.
Figure 4:
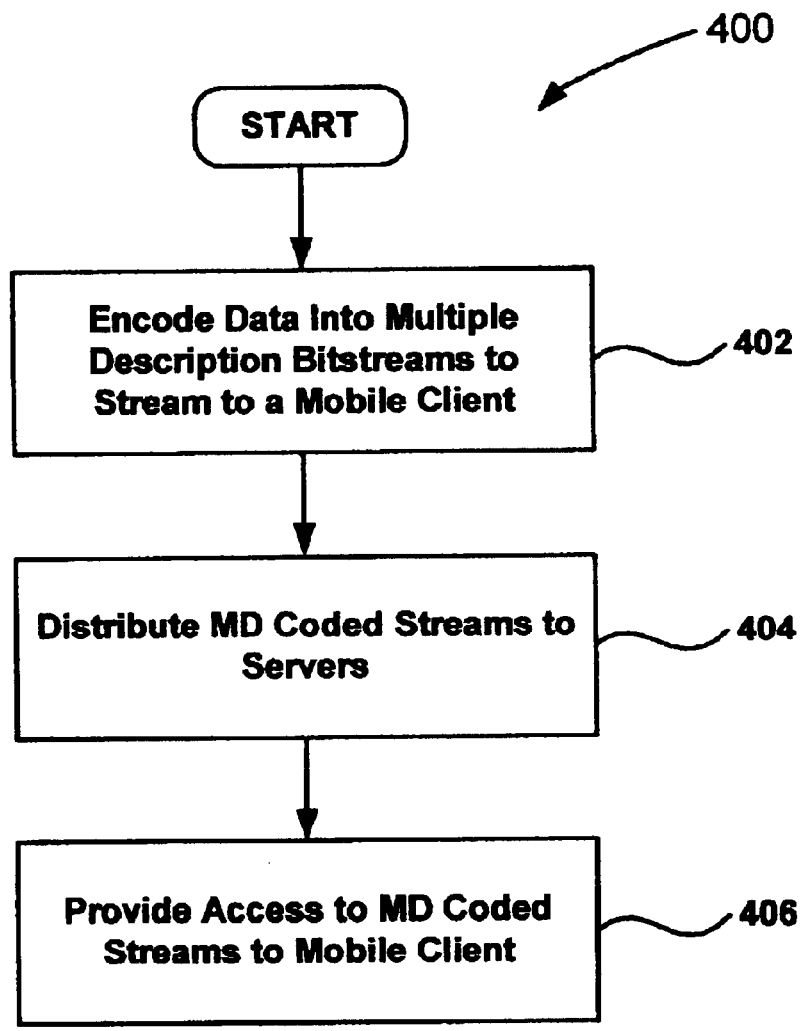
FIG. 4 is a flow chart of steps performed in accordance with one embodiment of the present claimed invention.

With reference next to FIG. 3A and flow chart 400 of FIG. 4, exemplary steps used by the various embodiments of present invention are illustrated. Flow chart 400 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. The computer-readable and computer-executable instructions are used to control or operate in conjunction with, for example, central processing unit 104 of FIG. 1.

With reference again to FIG. 3A, a system 300 that delivers streaming media to mobile clients over hybrid wired/wireless networks in accordance with one embodiment of the present invention is shown. In one embodiment, system 300 consists of one or more servers (304a–304e), one or more wireless base stations (306a and 306b), and one or more mobile clients (e.g. cellphone 302 and/or personal digital assistants (PDAs) 308a and 308b) as shown in FIG. 3A. The system of the present invention may include a greater or lesser number of components than are specifically illustrated in the embodiment of FIG. 3A. As an example, although not always required, a content server 310 also forms a portion of the system of the embodiment of FIG. 3A. Importantly, in the following discussion, the term "server" is in various embodiments is intended to encompass a device functionally resembling a computer (e.g. having computation ability, memory, and/or connectivity capability). A typical server according to the definition as used in the present application may include, but is not limited to, any computer (e.g. mainframe, corporate server, personal computer (PC), laptop, personal digital assistant (PDA), and the like). In various other embodiments of the present invention, the term "server" is intended to encompass a device not typically considered a computer but having similar capabilities. In such an embodiment, the server is comprised, for example, of an advanced cell phone.

Figure 3B:
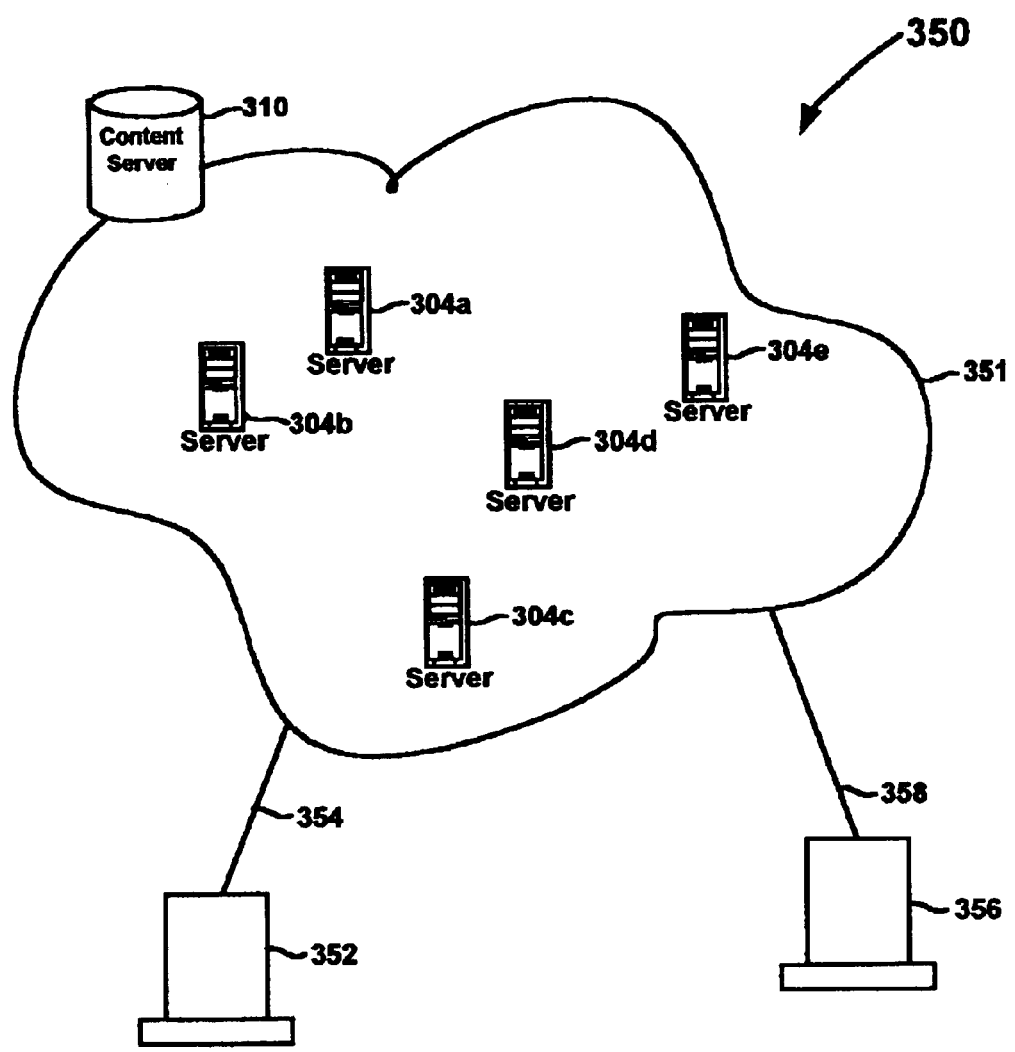
FIG. 3B is a schematic diagram illustrating a fixed client system employed in accordance with various embodiments of the present claimed invention.

Importantly, it should be noted that the methods of various embodiments of the present invention are applicable with fixed wired clients and/or mobile wireless clients. Specifically, the mobile client case is a more general and superset version of the fixed client case. For example, in the mobile client case, the MD bitstreams are provided by a server or servers to a mobile client through one or more base stations. In contrast, the corresponding fixed (wired) client case would have the server or servers instead provide the MD bitstreams directly to the fixed client without the need for a base station. Therefore, in the following discussion, will specifically discuss the more general and superset mobile client case. For purposes of brevity and clarity, redundant examples of fixed client cases are not presented herein. It will be understood by one of ordinary skill in the art, however, that in an example in which MD bitstreams are provided by a server or servers to a mobile client by one or more base stations, in the fixed client case the server or servers would instead provide the MD bitstreams to the fixed client without the need for a base station. With reference now to FIG. 3B, a system 350 that delivers streaming media to fixed clients over a network (e.g. the Internet) in accordance with one embodiment of the present invention is shown. In one embodiment, system 350 consists of a one or more fixed clients (e.g. personal computers 352 and 356), one or more servers (304a–304e), a content server 310. In the present embodiment fixed client 352 is coupled to network 351 via a wired link 354. Similarly, fixed client 356 is coupled to network 351 via a wired link 358. The system of the present invention may include a greater or lesser number of components than are specifically illustrated in the embodiment of FIG. 3B. As an example, although not always required, content server 310 also forms a portion of the system of the embodiment of FIG. 3B. As mentioned above, in the following discussion, the term "server" is in various embodiments intended to encompass a device functionally resembling a computer (e.g. having computation ability, memory, and/or connectivity capability). A typical server according to the definition as used in the present application may include, but is not limited to, any computer (e.g. mainframe, corporate server, personal computer (PC), laptop, personal digital assistant (PDA), and the like). In various other embodiments of the present invention, the term "server" is intended to encompass a device not typically considered a computer but having similar capabilities. In such an embodiment, the server is comprised, for example, of an advanced cell phone.

Furthermore, it should be noted the present invention is well suited to use in any of a variety of wired and/or wireless networks, and also in the various combinations thereof. For example, embodiments of the present invention are well suited to use in: wired and wired networks (e.g. a wired network infrastructure also having a wired connection to the client); wired and wireless networks (e.g. a wired network infrastructure having a wireless connection to the client); wireless and wired networks (e.g. a wireless network infrastructure having a wired connection to the client); and wireless and wireless networks (e.g. a wireless network infrastructure also having a wireless connection to the client). More specifically, the methods of the present invention are also applicable if all of the links are wireless, as in the case of an ad-hoc wireless network where some of the nodes are acting as servers and others as clients. Note that a node may act as both a server (source of information) and a client (sink of information) at the same time. An interesting example of this later case is when each node is a laptop or PDA with a wireless connection. Also note that each cell phone may act as both a sender and receiver of MD streams in a wireless/wired/wireless situation.

Referring now to FIGS. 3A and 3B, in following discussions in which, for example, MD bitstreams are provided by a server or servers to a mobile client through one or more base stations (as shown in FIG. 3A), the corresponding fixed client case would have the server or servers instead provide the MD bitstreams to the fixed client without the need for a base station. Hence, it can be seen that the below recited mobile client-based examples and discussions are applicable as well to fixed client systems. That is, the following mobile client-based examples and discussions are not intended to limit the present invention to applicability only in mobile client systems.

With reference now to flow chart 400 of FIG. 4, steps performed in accordance with one embodiment of the present invention are shown. Although specific steps are disclosed in flow chart 400 of FIG. 4, such steps are exemplary. That is, the present invention is well suited to performing various other steps or variations of the steps recited in FIG. 4. At step 402, the present embodiment encodes data to be streamed to a mobile client into two or more MD streams. In one embodiment, the data to be streamed is comprised of a video sequence. As mentioned above, MD streams have the property that any subset of them can be decoded into a media stream whose quality depends on the number of decoded streams. In the present embodiment, this encoding may be done in real time or it may be done in advance in which case the pre-computed MD streams are stored on a content server (e.g. content server 310 of FIG. 3).

Referring still to step 402, in the present embodiment, the present invention uses specially designed multiple description media streams which contain complementary information (as opposed to duplicating the information). Specifically, the original media stream is coded using a multiple description algorithm into a number of separate descriptions or bitstreams. These descriptions have the property that (1) each bitstream is independently useful to the client, and (2) each bitstream contains complementary information. For example, consider the case of multiple description coding with two descriptions. As long as the receiver receives either of the bitstreams, it can decode a usable media stream. If the receiver receives both bitstreams it can decode a higher quality media stream than if it had received either bitstream alone. In addition, the MD streams provide these properties while requiring only slightly higher total bit rate than that required by a conventional coding algorithm that does not provide these properties. Additionally, an important point is that each description or MD bitstream is equally important. This is in contrast to conventional scalable schemes, where the base-layer bitstream is critically important. That is, in conventional scalable schemes, if the base-layer bitstream is lost the other bitstream(s) are useless. Specifically, since each MD bitstream is equally important in the present embodiment, there is no single point of failure in the sense that there is no single bitstream that must be received.

At step 404, the present embodiment then distributes the MD streams to a number of different servers (e.g. servers 304a–304e of FIG. 3) placed at intermediate nodes throughout a network. By, appropriately distributing the MD streams, the present invention eliminates the possibility that any single fault may render all streams useless. In one embodiment, the present invention uses servers that are placed at intermediate nodes in the network, for example alongside a router or a wired/wireless gateway. In the present embodiment, servers 304a–304e send the MD streams to nearby wireless base stations 306a and 306b as mobile clients 302, 308a, and 308b roam through their coverage areas. Wireless base stations 306a and 306b receive data from the wired network and wirelessly transmit this data to mobile clients 302, 308a and 308b. Likewise, wireless base stations 306a and 306b wirelessly receive data from mobile clients 302, 308a and 308b and transmit this data to the wired network. Thus, wireless base stations 306a and 306b can be viewed as having a wired/wireless gateway and a wireless transmitter/receiver. Furthermore, as will be described in detail below, the various embodiment of the present invention overcome the non-guaranteed, best-effort nature of existing networks by dynamically delivering MD streams to mobile users from the most accessible servers based on user mobility, network congestion, and server load.

With reference still to step 404, the present invention ensures that no single fault causes the loss of all streams. In the context of the above example, a video sequence media stream may be coded into two MD streams which are then placed at two different storage modules, connected to two different servers at two different locations in the network. In so doing, the two MD streams can be sent over two different paths in the wired network, and two different base stations may transmit the two MD streams over two different wireless channels to the receiving client. In this manner, the present embodiment achieves a level of diversity which eliminates many potential single points of failure.

Referring now to step 406, the present embodiment provides access to the MD coded streams for a mobile client. That is, the MD streams are accessible to, for example, a requesting cell phone, PDA, laptop computer, or other such mobile client.

Referring again to steps 402, 404 and 406, a detailed example (using FIG. 3 for illustration) is provided below of the operation of the present embodiment. In the present example, a video sequence media stream has previously been coded into two MD streams which were then both stored on content server 310. The first of the two MD streams is placed at a first storage module, coupled to server 304*a*. The second of the two MD streams is placed at a second storage module coupled to server 304*e*. When the video sequence media stream is requested, for example, by cell phone 302, the first of the two MD streams is sent over a first path to cell phone 302, and the second of the two MD streams is sent over a second path to cell phone 302. In the present example, the first path comprises transmission over a wired network connection from server 304*a* ultimately to wireless base station 306*a*, and then wirelessly transmitting the first MD stream of the requested video sequence from wireless base station 306*a* to cell phone 302. Furthermore, in the present example, the second path comprises transmission over a wired network connection from server 304*e* ultimately to wireless base station 306*b*, and then wirelessly transmitting the second MD stream of the requested video sequence from wireless base station 306*b* to cell phone 302. The MD streams of the present embodiment have the property that any number of streams can be decoded into a sequence in which the quality of the decoded sequence depends on the number of decoded MD streams. Specifically, any one MD stream can be decoded into baseline quality data; any two MD streams can be decoded into improved quality data; and so on until finally all the MD streams can be decoded into the highest quality data. Thus, should one of the paths fail in the preceding example (e.g. the second path), cell phone 302 is still able to receive and utilize the requested video sequence based solely on receiving only one of the MD streams.

Although such first and second paths are recited in the present example, the present invention is well suited to use with the numerous paths which can be constructed within, for example, the network of system 300. Additionally, although two MD streams are recited in the present description, the present invention is well suited to use with more than two MD streams of data. Thus, the present embodiment, composed of multiple description coding and system diversity, provides improved system reliability in a more efficient manner than the conventional approach of resource duplication. Furthermore, the proposed system enables the elimination of a number of single points of failure that afflict conventional systems. Also, as mentioned above, for purposes of clarity and brevity, the above and following discussion and examples may specifically deal with video data. The present invention, however, is not limited solely to use with video data. Instead, the present invention is well suited to use with audio-based data, speech-based data, image-based data, graphic data, web page-based data, and the like.

Thus, the present invention provides a method and system for streaming media to fixed clients and/or mobile clients. The present invention further provides a method and system for streaming media to fixed clients and/or mobile clients wherein the method and system provides increased reliability and efficiency over conventional systems.

Furthermore, the multiple description bitstreams may be placed on servers in a variety of ways depending on the specific situation. For example, some servers may store all of the descriptions, while other servers may store only a subset of the descriptions. An example of the former is a central server which has high connectivity to a large number of clients, it may store all of the descriptions and adaptively choose to transmit a specific subset of the descriptions to each specific client based on the client's particular situation (e.g. the other servers that the client is connected to and the descriptions that these other servers can provide). On the other hand there may be other servers for which only a subset of the descriptions are stored, for example only the first description may be stored on some servers and the second description may be stored on other servers. The strategy for distributing descriptions to different servers may depend on a number of factors such as each server's compute and storage capabilities, its connectivity, typical network conditions, disjointness of paths, and the popularity of the specific media to be delivered.

When coding a specific media sequence, the media may be coded into multiple descriptions where each description requires the same bit rate and provides approximately the same quality. This may be referred to as balanced multiple description coding. Alternatively, the media may be coded into multiple descriptions where each description may require a different bit rate and may provide a different quality. This may be referred to as unbalanced multiple description coding. Coding a media into unbalanced multiple descriptions is important in situations where unbalanced operation is required, e.g. when one has unbalanced storage available at different servers or unbalanced available bandwidths on different paths. For both balanced and unbalanced multiple description coding, the key property is that as long as the client receives any subset of the multiple descriptions it can produce a usable decoded media stream, and that as it receives more descriptions the quality of the decoded media stream would increase.

A media sequence may be initially coded into balanced multiple description bitstreams, where each bitstream requires approximately the same bit rate, and these multiple descriptions streams may be appropriately placed at different servers in the network. These MD bitstreams may be subsequently transcoded to different lower bit rates in order to appropriately match the bandwidths available to a client at any particular time. For example, if a specific client requires unbalanced operation, e.g. if there are two paths available to the client and the available bandwidth of each path is different, the servers can transcode the multiple description bitstreams to the appropriate bit rates available on each path. Furthermore, the available bit rate along a specific path may vary as a function of time, and the server responsible for delivering the multiple description bitstream along that path can then appropriately transcode the bitstream to match the available bit rate on that path as a function of time. In this manner, the system can efficiently use the available bandwidth to maximize the reconstructed quality at the client.

The distribution of multiple description bitstreams to different servers, as well as the assignment of different servers to transmit different MD bitstreams to a specific client, depends on a number of factors including: demand on each server, available bandwidth and loss along the path from each server to the client, and the disjointness of the multiple paths.

The issue of disjointness does not arise in prior work since conventional approaches transmit a single bitstream along a single path. In the proposed approach multiple bitstreams are explicitly transmitted along multiple paths, and it is desired that these multiple paths be as disjoint as possible in order to minimize the probability that a single fault may lead to the loss of all of the multiple descriptions. For example, in the case of two MD bitstreams, each stream is sent over a separate path from a server to the client. Each of these paths consists of a sequence of links, and these two paths may include a number of shared links as well as a number of links that are not shared. Shared links are referred to as joint links and unshared links are referred to as disjoint links. Ideally, all of the links on the two paths are disjoint. However, in practice this may sometimes not be possible. The primary goal is to minimize the number of lossy joint links. For example, if an approximately lossless backbone link is joint or shared by both paths it will not effect the communication quality since the link is lossless. However, a lossy joint link can have a detrimental effect on the performance of the system since any losses, e.g. produced by congestion, may lead to the loss of both descriptions. Therefore, given a particular client, the system carefully chooses two servers to send the two multiple descriptions to the client such that these servers have maximally disjoint paths between them and the client. Furthermore, to distribute MD streams on a set of servers, the anticipated location of clients as well as the connectivity between each server and the anticipated clients are taken into account in order to determine the distribution that would enable the maximally disjoint paths between servers and anticipated clients. Of course, other more conventional metrics such as available bandwidth and losses on each link are also taken into account in this optimization. These conventional metrics are not discussed as they are also used in conventional systems.

Initial Multiple Description Bitstream Placement and Redistribution on Servers

As will be discussed in greater detail below, the MD media bitstream system of the various embodiments of the present invention must perform a number of steps prior to and during a streaming session. The present section specifically discusses the assignment and distribution to servers, e.g. servers $304a-304e$, located throughout a network such as is shown in FIG. 3.

In the present embodiment, prior to or upon a client request, the appropriate data (e.g. a video sequence) is coded into MD bitstreams. Next, the MD bitstreams are assigned and distributed to servers that are located throughout the network. To dynamically minimize end-to-end (i.e. server-to-client) delay, content is placed at servers at regions with highly anticipated demand (e.g. hot spots). Moreover, MD bitstreams are distributed among servers in a way so any client can find a complete set of MD bitstreams in its closest vicinity.

The present embodiment provides a method to 1) initially populate servers with MD bitstreams from content providers, and 2) redistribute the MD bitstreams among servers after the initial population. The initial server population method of the present embodiment takes place when fresh content needs to be distributed initially to servers in anticipation of client requests, and also when a client requesting content encounters a miss at one or more servers in the client's vicinity. As an example, the present initial server population method is employed when a client requests a movie trailer that has not yet been loaded to any server.

The redistribution of the MD bitstreams among the servers method of the present embodiment takes place when parameters such as, for example, usage patterns, mobility trends, network conditions, disjointness of paths to mobile clients, computation sizes and/or bitstream sizes change. One embodiment of the present method also considers such parameters during initial population of the servers with the MD bitstreams. Other parameters which provoke the redistribution of the MD bitstreams among the servers include, for example, network connectivity, network topology, server load, server storage space, server availability, and server I/O bandwidth. The present initial server population method is employed, for example, when, as a client moves, MD bitstreams are pre-fetched into servers at the new region if not available already.

Figure 5:
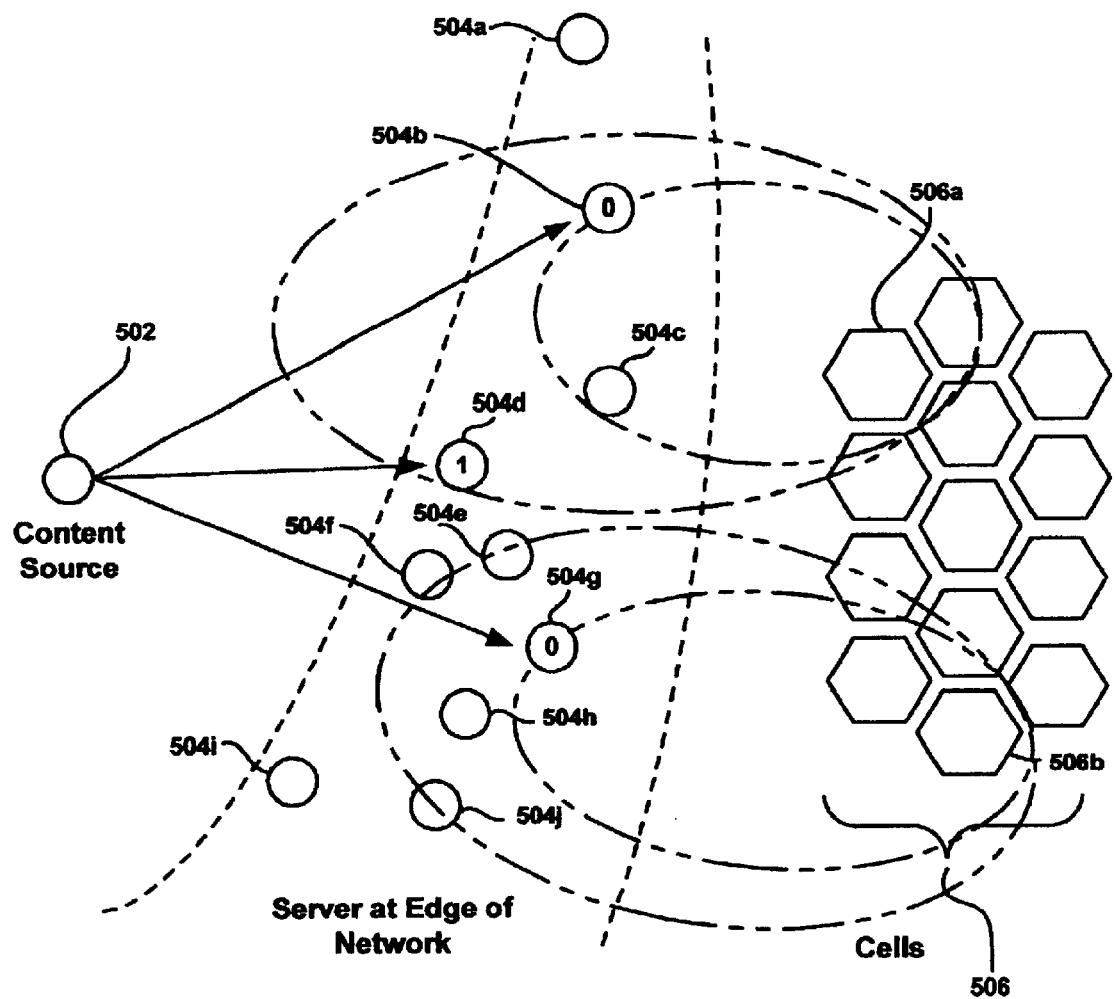
FIG. 5 is a schematic diagram of a content server, a plurality of servers having MD bitstreams stored thereon, and a series of cells in accordance with various embodiments of the present claimed invention.

The methods of the present embodiment will now be described in conjunction with FIG. 5 and flow chart 600 of FIG. 6. FIG. 5 is a schematic diagram illustrating a content source 502, a plurality of servers $504a-504j$, and a plurality of cells 506 including cell 506a and cell 506b. Although specific steps are disclosed in flow chart 600 of FIG. 6, such steps are exemplary. That is, the present invention is well suited to performing various other steps or variations of the steps recited in FIG. 6. Furthermore, the following discussion will begin with the initial server population method of the present embodiment. With reference now to step 602 of FIG. 6, the present method first identifies the cell, c0, with the highest demand estimated in real-time, or anticipated highest demand in the foreseeable future above a certain threshold value, v, i.e. the present embodiment identifies the "hottest spot". If no such cell exists, then there is not enough client concentration to require server population according to the present embodiment. If such a cell does exist, the present embodiment proceeds to step 604. The present invention is well suited to varying the threshold value, v, to a desired value. For purposes of illustration, it will be assumed that cell 506a of FIG. 5 is found to be the cell with the highest demand above the threshold value, v. Also, in another embodiment of the present invention, a server is populated with the MD bitstreams when it exhibits high connectivity in the network, and, thus, is able to readily serve nearby hot spots with low delay and high bandwidth. In other words, in one such embodiment, even if a server is not located at the "hottest spot" or even at a hot spot, if it is close to a hot spot in terms of network conditions, then it can be populated with MD bitstreams.

Importantly, it should be noted that in fixed client or wired embodiments of the present invention, instead of serving cells, the servers will service, for example, PoPs (point of presence) or geographical locations in the network (e.g. the Internet). Furthermore, in fixed client or wired embodiments, instead of identifying a cell as the "hottest spot", the present invention identifies the PoP with the most requests as the "hottest spot".

At step 604, the present embodiment then initializes the number of servers (S) required to service this "hottest" cell, d, to be N, where N is the number of MD bitstreams composing the content to be streamed to the mobile client. Again for purposes of illustration, in the present embodiment, a video sequence has been coded into two MD bitstreams. The first MD bitstream is represented as "0" and the second MD bitstream is represented by a "1". Although only two MD bitstreams are recited in the above embodiment, the present invention is well suited to media coded into more than two MD bitstreams. Additionally, for purposes of clarity and brevity, the above and following discussion and examples may specifically deal with a video sequence. The present invention, however, is not limited solely to use with a video sequence. Instead, the present invention is well suited to use with audio-based data, speech-based data, image-based data, graphic data, web page-based data, and the like. Also, although d is set to be equal to N in the present example, the present invention is also well suited to setting the value, d, to be other than equal to N.

With reference still to step 604, because two MD bitstreams are recited above (i.e. because N is 2 in the present example), the present embodiment sets the number of servers (S), d, required to service the "hottest cell, cell 506a, at two.

At step 606, the present embodiment then finds the d servers closest to the cell, c0, and determines whether those servers contain the N MD bitstreams. That is, the present method determines which subset of the available servers are disposed close to cell, c0. Thus, in the present example, the present embodiment finds the two servers which are closest to cell 506a. Note that in the present embodiment, "closeness" is weighted by the current network conditions so that a server with congested links will appear "far" from the hottest cell, c0, even though it may be topological close. In the present example, servers 504b and 504d are deemed closest to cell 506a. In the present example, the present method then determines if the two MD bitstreams are present at servers 504b and 504d. Furthermore, the present embodiments are metric-independent and, hence, will work for other convenient metrics of closeness such a geographical distance.

With reference still to step 606, if the closest servers contain the N MD bitstreams, then the present method is finished with the hottest cell, c0, and moves on to the next hottest cell (i.e. return to step 602). If the closest servers do not contain the N MD bitstreams, the present embodiment moves on to perform step 608. Thus, in the present example, if the two MD bitstreams of the video sequence are present at servers 504b and 504d, then the present method returns to step 602. If, on the other hand, the two MD bitstreams of the video sequence are not present at servers 504b and 504d, then the present method proceeds to step 608. Thus, in the illustration of FIG. 5, because the first MD bitstream, 0, is present at server 504b, and the second MD bitstream, 1, is present at server 504d, the present method would return to step 602. If, however, either the first MD bitstream, 0, or the second MD bitstream, 1, was not present at any of servers 504b and 504d, the present method would proceed to step 608. Such a condition would occur, for example, during an initial population of the servers according to the present method. That is, upon identification of the hottest cell, the required number of servers, and the determination of the closest servers (and assuming no prior population of the current MD bitstreams), it would be found that the MD bitstreams of interest would not be present at the closest servers (or any other servers). Thus, barring any prior population of the MD bitstreams of interest, the present method will ordinarily proceed to step 608.

At step 608, the present embodiment then determines if it is effective to distribute all N MD bitstreams to the d servers.

As an illustrative example, it may not be effective to distribute all N MD bitstreams to the d servers when one or more of the servers are already very heavily loaded, lacks sufficient memory to store an MD bitstream, or is otherwise unsuited for the desired storage of the MD bitstream. In one embodiment, the present distribution step is dependent on server-dependent conditions such as load. For example, an MD bitstream is not placed on a particular server if that server is loaded over some specified threshold. The present invention is well suited to altering the aforementioned specific threshold to accommodate various objectives. As a result, in the present embodiment, a server that is lightly loaded is chosen over one that is closer to the hot spot (i.e. hottest cell, c0) but which already carries a heavy load. In the present example, if it is assumed that, for example, either the first MD bitstream, 0, or the second MD bitstream, 1, was not present at any of servers 504b and 504d, the present method would then determine if the two MD bitstreams could be distributed to servers 504b and 504d. If it is effective to distribute all N MD bitstreams to the d servers, the present method proceeds to step 612 described below. If, on the other hand, it is not effective to distribute all N MD bitstreams to the d servers, then the present method proceeds to step 610.

At step 610, if it was determined at step 608 that it is not effective to distribute all N MD bitstreams to the d servers, the present method increments the number of servers, d. In so doing, the present method increases the potentially available server space and then returns to step 606. Depending on the implementation, step 606 and step 608 do not have to consider the servers that were deemed not suitable for MD bitstream placement in the next iteration. That is, in one embodiment, the present invention increases the search space of suitable MD bitstream placement, but it is not necessary to consider the servers that did not pass step 606 and/or step 608 previously, unless the load conditions on those servers changed in the meantime. With reference to the present example, if the two servers 504b and 504d were not able to accommodate the storage of the two MD bitstreams, the number of servers would be increased from two to three. In one embodiment, the number of servers is incremented by selecting the next closest server to the hottest cell, c0. The present example would then return to step 606 and continue from that point.

At step 612, if it was determined at step 608 that it is effective to distribute all N MD bitstreams to the d servers, the present method then distributes the N MD bitstreams to the d servers. Hence, with reference to the present example, if the two servers 504b and 504d were cumulatively able to accommodate the storage of the two MD bitstreams thereon (and two MD bitstreams had not previously been stored thereon), the two MD bitstreams would be stored cumulatively on servers 504b and 504d. As a more specific example, in one embodiment, at least one of the MD bitstreams is stored on server 504b (e.g. MD bitstream 0) and at least one of the MD bitstreams (e.g. remaining MD bitstream 1) is stored on server 504d.

While the above description refers primarily to the first application of the present method (i.e. initial population of servers with MD bitstreams from content providers), the second portion of the present method (i.e. redistribution of the MD bitstreams among servers after the initial population) is somewhat similar. Specifically, in the case of redistribution of the MD bitstreams among servers after the initial population, the present method begins the method of steps 602–612 with updated user statistics to identify the hottest cell, and to determine if the new hot spots (i.e. hottest cells) are being properly serviced. Hence, the present embodiment enables dynamic reassigning of MD bitstreams based upon user defined criteria. As an example, in one embodiment, the method of the present invention (i.e. steps 602–612) is restarted each time interval of a predefined duration. In another embodiment, the method of the present invention is restarted based upon a hit or miss rate at a given server. In still another embodiment, the method of the present invention is restarted based upon certain known traffic patterns to which the network is subjected. In yet another embodiment, the method of the present invention is restarted based upon network congestion conditions. Various other embodiments of the present invention reassign MD bitstreams based upon other criteria. For example, in various embodiments, MD bitstreams are reassigned when: a server is overloaded (i.e. the server is running out of computational cycles); the storage capacity of at a server is exceeded; or upon network partition (e.g. link failure which is different from congestion). Although such specific examples are recited above, the present method is well suited to dynamically reassigning the MD bitstreams to servers after the initial population thereof based upon various other parameters. The present invention is also well suited to handle the diurnal nature of Internet workload by varying the location of MD bitstreams.

Figure 6:
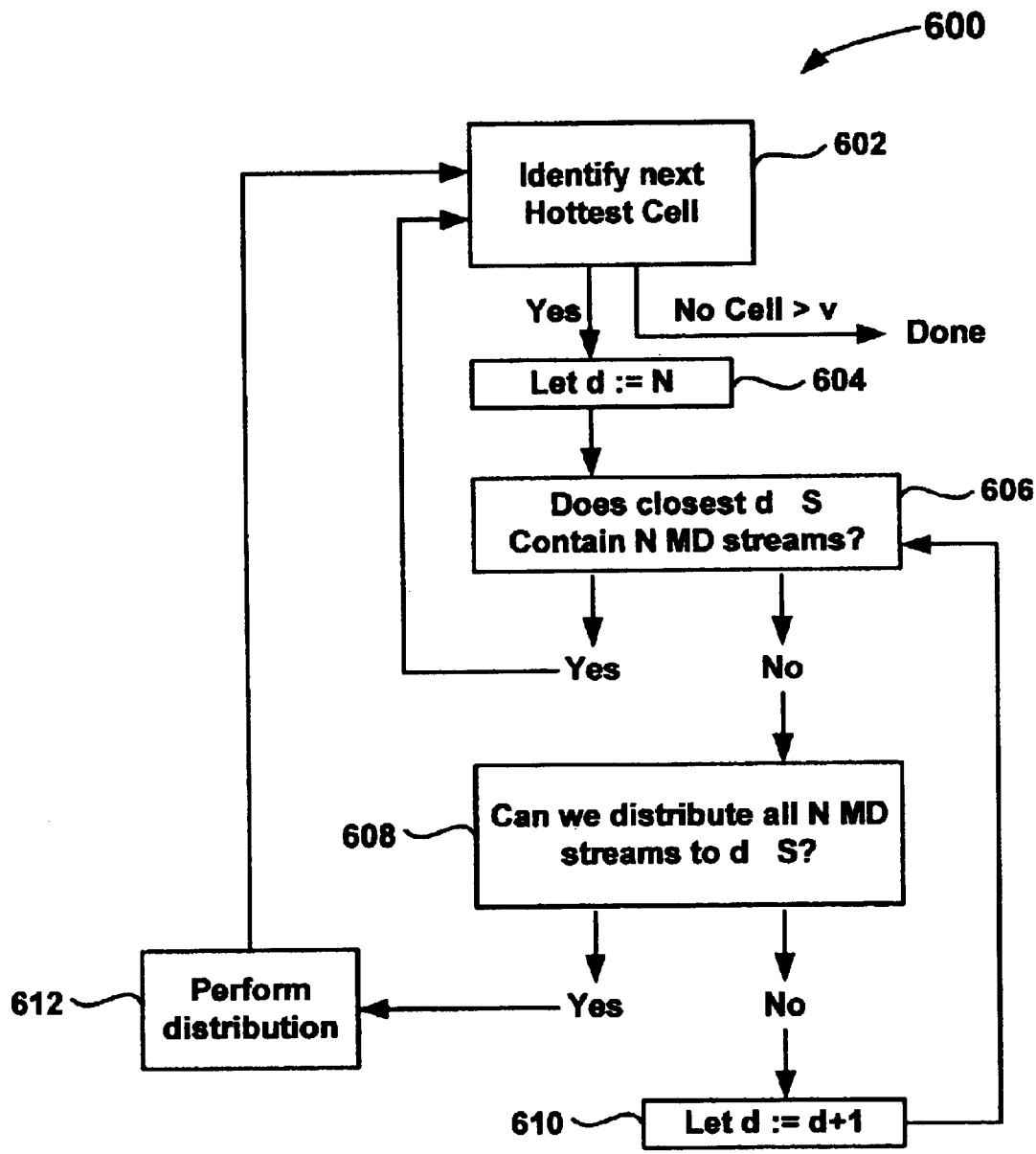
FIG. 6 is a flow chart of steps performed in accordance with one embodiment of the present claimed invention.

The present embodiment is also well suited to varying the method recited in steps 602–612 of FIG. 6 such that the data to be streamed is initially populated on or redistributed to portions of a network where greater activity is expected. For example, in one embodiment of present invention, the MD bitstreams are stored on or redistributed to those servers which are proximate to or accessed from a heavily traveled commute corridor. In so doing, the MD bitstreams are disposed more closely to the large quantity of mobile clients which are expected to be traveling along commute corridor. In one embodiment of the present invention, during non-commute hours, the MD bitstreams are then redistributed from those servers which are proximate to or accessed from the heavily traveled commute corridor to a more appropriate location. More generally, the present method is well suited to varying the location at which the MD bitstreams are stored to accommodate anticipated mobile client location and demand.

Several distinct advantages are realized by the present method. For example, in conventional schemes, in order to have content to be streamed wholly available on a plurality servers, the entire content would have to be completely duplicated and placed in its entirety on every one of the plurality of servers. Such duplication is extremely inefficient and consumes valuable memory space as well as disk space. To the contrary, the present invention generates a plurality of MD bitstreams of the content to be streamed. As stated above, separate MD bitstreams have the property that they are all independently decodable from one another. Specifically if a decoder receives any single bitstream it can decode that bitstream to produce a useful signal (without requiring access to any of the other bitstreams). Thus, in the present embodiment, the number of generated bitstreams can be spread over a larger number of servers without requiring the inefficient duplication associated with conventional systems. As an example, assume that a video sequence is MD coded into four MD bitstreams. In the present method, the four MD bitstreams could be individually placed on four respective servers located throughout a network (i.e. one description to each of the four servers). Thus, the present invention allows the data to be spread over a larger area thereby potentially providing easier access to a greater number of mobile clients, and/or increasing the range over which the data is readily available to a mobile client. Furthermore, the four MD bitstreams will cumulatively consume only slightly more memory than is necessary to store a single conventionally stored copy of the content to be streamed. In order to achieve such coverage using conventional methods, four complete duplicates of the entire content to be streamed would have to be placed on each of the above-mentioned four servers.

As yet another benefit, the present embodiment provides an intrinsic path diversity advantage without requiring inefficient complete duplication of data to be streamed. That is, using the above example of four MD bitstreams, the mobile client has the potential of requesting and receiving all four streams via four separate transmission paths. Thus, a single point of failure (e.g. a single server failure) or a network link failure (e.g. partitioning of the topology) does not prevent receipt by the mobile client of the streamed data. It should be understood that the various benefits resulting from path diversity are beneficial regardless of whether a client moves or remains static.

As still another benefit, the present embodiment is also well suited to varying the method recited in steps 602–612 such that enhanced reliability is achieved. For example, a content provider may wish to ensure that mobile clients have superior access to the data to be streamed. In such a case, the content provider can opt to expand path diversity options and MD bitstream availability. In one extreme example, the method of the present embodiment would store all of the plurality of MD bitstreams on every available server such that the data is readily available to a mobile client in communication with the network. The present method is also well suited to a less drastic approach that does not store each of the plurality of MD bitstreams on every available server, but still provides enhanced reliability by increasing the number of servers on which the MD bitstreams are stored and/or by storing more than one of the MD bitstreams on the selected servers. More generally, the present method is well suited to varying the density of the stored MD bitstreams in the network.

As yet another benefit, the present invention is also well suited to transmitting MD bitstreams over a path which operates most effectively. That is, the present embodiment is also well suited to, for example, transmitting all MD bitstreams from a single server (on which all MD bitstreams happen to be commonly stored) if such an approach proves most expeditious. More generally, the present method is not limited to, for example, transmitting each of the separate MD bitstreams to a mobile client via different respective paths.

As still another benefit, the present invention is also reduces input/output (I/O) bandwidth used on a server as compared to conventional approaches. That is, in the present embodiments, each MD bitstream is encoded at a lower bitrate than the original complete stream. Hence, the transmission of the MD bitstream can be accomplished at a bitrate which is lower than that required to transmit the original complete stream.

Thus, the present invention provides a method and system for streaming media to fixed clients and/or mobile clients. The present invention further provides a method and system for streaming media to fixed clients and/or mobile clients wherein the method and system provides increased reliability and efficiency over conventional systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for streaming media data to a client, said method comprising the steps of:
   a) encoding said media data to be streamed to said client into a first multiple description bitstream and into a second multiple description bitstream;
   b) determining the appropriate plurality of servers from a network of servers onto which said first and second multiple description bitstreams should be distributed; and
   c) distributing said first and second multiple description bitstreams to said appropriate plurality of servers disposed at intermediate nodes throughout a network, such that said client is provided with access to said media data via a plurality of servers and transmission paths.

2. The method for streaming media data to a client as recited in claim 1 wherein said step b) comprises:
   determining which of said servers in said network of server are located closest to an anticipated region of high demand from said client.

3. The method for streaming media data to a client as recited in claim 1 wherein said step b) comprises:
   using at least one parameter to determine said appropriate plurality servers from said network of servers which should have said first and second multiple description bitstreams distributed thereto.

4. The method for streaming media data to a client as recited in claim 3 wherein said at least one parameter is selected from the group comprising usage patterns, mobility trends, network conditions, disjointness of paths to clients, computation sizes, network connectivity, network topology, server load, server storage space, server I/O bandwidth, server availability, and size of said first and second multiple description bitstreams.

5. The method for streaming media data to a client as recited in claim 1 wherein said appropriate plurality of servers has a quantity approximately the same as the number of multiple description bitstreams encoding from said media data.

6. The method for streaming media data to a client as recited in claim 1 wherein said client is a mobile client.

7. A method for distributing a plurality of multiple description bitstreams in a network comprised of a plurality of servers, said network for providing streaming media to a client, said method comprising the steps of:
   a) determining which of said plurality of servers are the appropriate plurality of servers for accommodating said client; and
   b) provided said plurality of multiple description bitstreams are not presently cumulatively stored thereon, distributing said plurality of multiple description bitstreams to said appropriate plurality of servers, said plurality of multiple description bitstreams encoded from data to be streamed to a client.

8. The method for distributing a plurality of multiple description bitstreams in a network comprised of a plurality of servers as recited in claim 7, wherein said step a) comprises:
   using at least one parameter to determine said appropriate plurality of servers for accommodating said client.

9. The method for distributing a plurality of multiple description bitstreams in a network comprised of a plurality of servers as recited in claim 7 wherein said at least one parameter is selected from the group comprising: usage patterns, mobility trends, network conditions, disjointness of paths to clients, computation sizes, network connectivity, network topology, server load, server storage space, server I/O bandwidth, server availability, and size of said plurality of multiple description bitstreams.

10. The method for distributing a plurality of multiple description bitstreams in a network comprised of a plurality of servers as recited in claim 7, wherein said step a) comprises the steps of:
    i) identifying a cell proximate to said network from which high demand for said plurality of multiple description bitstreams is anticipated;
    ii) determining a subset of said plurality of servers which are disposed close to said cell;
    iii) determining if said subset of said plurality of servers have said plurality of multiple description bitstreams cumulatively stored thereon;
    iv) provided said plurality of multiple description bitstreams are not already cumulatively stored on said subset of said plurality of servers, determining if said plurality of multiple description bitstreams can be cumulatively stored on said subset of said plurality of servers;
    v) provided said plurality of multiple description bitstreams can be cumulatively stored on said subset of said plurality of servers proceeding to said step b); and
    vi) provided said plurality of multiple description bitstreams can not be cumulatively stored on said subset of said plurality of servers, increasing the size of said subset of said plurality of servers and repeating steps iii) through vi until proceeding to said step b).

11. The method for distributing a plurality of multiple description bitstreams in a network comprised of a plurality of servers as recited in claim 10, wherein said step ii) comprises:
    determining said subset of said plurality of servers which are disposed close to said cell to be comprised of a quantity of said servers which is the same as the quantity of multiple description bitstreams comprising said plurality of multiple description bitstreams.

12. The method for distributing a plurality of multiple description bitstreams in a network comprised of a plurality of servers as recited in claim 7, wherein said step b) comprises:
    b) provided said plurality of multiple description bitstreams are not presently cumulatively stored thereon, individually distributing said plurality of multiple description bitstreams to said appropriate plurality of servers such that not all of said plurality of multiple description bitstreams are stored on every one of said appropriate plurality of servers.

13. The method for distributing a plurality of multiple description bitstreams in a network comprised of a plurality of servers as recited in claim 7, wherein said step b) comprises:
    b) provided said plurality of multiple description bitstreams are not presently cumulatively stored thereon, individually distributing said plurality of multiple description bitstreams to said appropriate plurality of servers such that only one of said plurality of multiple description bitstreams is stored on every one of said appropriate plurality of servers.

14. The method for distributing a plurality of multiple description bitstreams in a network comprised of a plurality of servers as recited in claim 11, wherein said step b) comprises:

b) provided said plurality of multiple description bitstreams are not presently cumulatively stored thereon, individually distributing said plurality of multiple description bitstreams to said subset of said plurality of servers such that each one of said plurality of multiple description bitstreams is stored on a respective one of said subset of said plurality of servers.

15. The method for distributing a plurality of multiple description bitstreams in a network comprised of a plurality of servers as recited in claim 10, wherein said step ii) comprises:

determining said subset of said plurality of servers which are disposed close to said cell by weighting current conditions of said network.

16. The method for distributing a plurality of multiple description bitstreams in a network comprised of a plurality of servers as recited in claim 7, wherein said distributing of said plurality of multiple description bitstreams comprises an initial population of said network with said plurality of multiple description bitstreams.

17. The method for distributing a plurality of multiple description bitstreams in a network comprised of a plurality of servers as recited in claim 7, wherein said distributing of said plurality of multiple description bitstreams comprises a redistribution of said network with said plurality of multiple description bitstreams.

18. The method for distributing a plurality of multiple description bitstreams in a network comprised of a plurality of servers as recited in claim 7, further comprising the step of:

c) repeating said step a) and said step b) based upon a parameter.

19. The method for distributing a plurality of multiple description bitstreams in a network comprised of a plurality of servers as recited in claim 18, wherein said step c) comprises:

repeating said step a) and said step b) based upon said parameter selected from the group comprising: a time interval, a server hit rate, a traffic pattern, server load, and a network congestion condition.

20. A method for distributing a plurality of multiple description bitstreams in a network comprised of a plurality of servers, said network for providing streaming media to a mobile client, said method comprising the steps of:

a) determining which of said plurality of servers are the appropriate plurality of servers for accommodating said mobile client by performing the steps of;

i) identifying a cell proximate to said network from which high demand for said plurality of multiple description bitstreams is anticipated;

ii) determining a subset of said plurality of servers which are disposed close to said cell;

iii) determining if said subset of said plurality of traffic servers have said plurality of multiple description bitstreams cumulatively stored thereon;

iv) provided said plurality of multiple description bitstreams are not already cumulatively stored on said subset of said plurality of servers, determining if said plurality of multiple description bitstreams can be cumulatively stored on said subset of said plurality of servers;

v) provided said plurality of multiple description bitstreams can be cumulatively stored on said subset of said plurality of traffic servers proceeding to said step b); and vi) provided said plurality of multiple description bitstreams can not be cumulatively stored on said subset of said plurality of servers, increasing the size of said subset of said plurality of servers and repeating steps iii) through vi until proceeding to said step b); and b) provided said plurality of multiple description bitstreams are not presently cumulatively stored thereon, individually distributing said plurality of multiple description bitstreams to said appropriate plurality of servers such that not all of said plurality of multiple description bitstreams are stored on every one of said appropriate plurality of servers.

21. The method for distributing a plurality of multiple description bitstreams in a network comprised of a plurality of servers as recited in claim 20, further comprising the step of:

repeating said step a) and said step b) based upon said parameter selected from the group comprising: a time interval, a server hit rate, a traffic pattern, server load, and a network congestion condition.

* * * * *

UNITED STATES PATENT AND TRADEMARK OFFICE
CERTIFICATE OF CORRECTION

PATENT NO. : 6,757,735 B2
DATED : June 29, 2004
INVENTOR(S) : John G. Apostolopoulos et al.

It is certified that error appears in the above-identified patent and that said Letters Patent is hereby corrected as shown below:

Title page,
Item [75], Inventors, should read -- John G. Apostolopoulos --

Signed and Sealed this

Fourteenth Day of September, 2004

JON W. DUDAS
*Director of the United States Patent and Trademark Office*